(12) United States Patent
Edwards et al.

(10) Patent No.: US 7,101,921 B2
(45) Date of Patent: Sep. 5, 2006

(54) POLYMER COMPOSITION

(75) Inventors: Steven Scott Edwards, Horsham, PA (US); Matthew Stewart Gebhard, New Britain, PA (US); Allen Philip Marks, Richboro, PA (US); Alvin Michael Maurice, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 54 days.

(21) Appl. No.: 10/269,402

(22) Filed: Oct. 11, 2002

(65) Prior Publication Data

US 2003/0088014 A1 May 8, 2003

Related U.S. Application Data

(60) Provisional application No. 60/329,919, filed on Oct. 17, 2001.

(51) Int. Cl.
*C09D 151/00* (2006.01)
*C09D 133/00* (2006.01)
*C08F 2/22* (2006.01)
*C08F 291/00* (2006.01)

(52) U.S. Cl. ............ 523/201; 524/458; 524/522; 524/523

(58) Field of Classification Search .......... 523/201; 524/458, 522, 523
See application file for complete search history.

(56) References Cited

U.S. PATENT DOCUMENTS

| 4,421,889 | A |   | 12/1983 | Braun et al. | |
|---|---|---|---|---|---|
| 4,654,397 | A |   | 3/1987 | Mueller-Mall et al. | |
| 5,210,113 | A | * | 5/1993 | Waters | 523/205 |
| 5,296,524 | A | * | 3/1994 | Waters | 523/319 |
| 5,308,890 | A |   | 5/1994 | Snyder | 523/201 |
| 5,534,310 | A | * | 7/1996 | Rokowski et al. | 427/494 |
| 5,596,035 | A |   | 1/1997 | Désor et al. | |
| 5,731,377 | A | * | 3/1998 | Friel | 524/522 |
| 5,744,540 | A |   | 4/1998 | Baumstark et al. | 524/558 |
| 5,922,334 | A | * | 7/1999 | Krasnansky et al. | 424/401 |
| 5,932,350 | A |   | 8/1999 | Lauer et al. | |
| 5,939,482 | A |   | 8/1999 | Kriessmann et al. | |
| 5,990,228 | A |   | 11/1999 | Eichman et al. | |
| 6,001,922 | A |   | 12/1999 | Clark et al. | |
| 6,005,042 | A |   | 12/1999 | Désor et al. | |
| 6,090,882 | A |   | 7/2000 | Trumbo et al. | |
| 6,417,267 | B1 | * | 7/2002 | Stockl et al. | 524/808 |
| 6,605,662 | B1 | * | 8/2003 | Zhao et al. | 524/458 |
| 6,649,679 | B1 | * | 11/2003 | Stockl et al. | 524/253 |
| 6,664,327 | B1 | * | 12/2003 | Daisey et al. | 524/523 |

FOREIGN PATENT DOCUMENTS

| EP | 414351 A1 | * | 2/1991 |
|---|---|---|---|
| EP | 0609756 A2 |   | 1/1994 |

* cited by examiner

*Primary Examiner*—Kelechi C. Egwim
(74) *Attorney, Agent, or Firm*—Kim R. Jessum; Gary D. Greenblatt

(57) ABSTRACT

A polymer composition including polymer particles containing a first polymer and a second polymer is disclosed. The first polymer has a crosslinked core and has a glass transition temperature in the range of –30° C. to 100° C. The second polymer containing select crosslinking groups and has a glass transition temperature in the range of –10° C. to less than 18° C. A process to prepare the polymer composition is provided. Also provided are a coated article containing a coating prepared from the polymer composition and a method of preparing the coated article. The polymer composition has good low temperature film formation and provides a film with an acceptable level of hardness.

4 Claims, No Drawings

US 7,101,921 B2

POLYMER COMPOSITION

CROSS REFERENCE TO RELATED PATENT APPLICATIONS

This is a non-provisional application of prior pending U.S. provisional application Ser. No. 60/329,919 filed Oct. 17, 2001.

This invention relates to a polymer composition containing polymer particles dispersed in an aqueous medium. The polymer particles contain a first polymer and a second polymer. A process is provided for preparing the polymer composition. Also provided is a method of using the polymer composition and an article prepared from the polymer composition. The polymer composition is film forming at low temperature and provides a coating having a hard film.

The hardness of a coating is related to the mechanical properties of the coating, and in particular, to the modulus of the coating. In many applications, a coating with certain mechanical properties, as characterized by the hardness, is desired to provide a protective film to an underlying substrate. Coatings having a suitable level of hardness may be prepared from aqueous polymer particle dispersions containing hard polymers, i.e. polymers with glass transition temperatures significantly above ambient temperatures. However, coating compositions containing these hard polymers typically include additives such as volatile coalescents to allow the effective formation of a dried film at ambient temperature. After formation of the film, the volatile coalescents evaporate, leaving a hard polymer film. The use of volatile coalescents including volatile solvents, is coming under increased scrutiny as they are a source of volatile organic compounds (VOC's) which can contribute to atmospheric pollution. An aqueous polymer composition which provides a hard coating and may be formulated either with lower levels of volatile coalescents or without volatile coalescents, is desired.

U.S. Pat. No. 6,005,042 discloses a polymer dispersion which forms films in the temperature range of 0° C. to 40° C. The polymer dispersion is formed by the stepwise emulsion polymerization of a first monomer mixture and a second monomer mixture. The first monomer mixture includes soft monomers having homopolymers with a glass transition temperatures below 0° C., hard monomers having homopolymers with a glass transition temperature above 65° C., carboxylic acid or carboxamide monomers, monomers having a keto group, and optionally other monomers. The second monomer mixture contains soft monomers, hard monomers, optionally carboxylic acid or carboxamide monomers, optionally monomers having a keto group, and optionally other monomers. The disclosed polymer dispersion is useful for preparing coatings on substrates which are not dimensionally stable. However, despite this disclosure, there is an ongoing need for polymer compositions that provide a combination of good low temperature film formation and result in the formation of hard films.

The inventors have surprisingly found a polymer composition that has good low temperature film formation properties and provides a hard film. The polymer composition contains select polymer particles including a crosslinked first polymer and a second polymer having select crosslinking groups.

The first aspect of this invention provides a polymer composition including polymer particles dispersed in an aqueous medium, wherein the polymer particles contain, based on the weight of the polymer particles: from 10 to 70 weight % first polymer; and from 30 to 90 weight % second polymer; wherein the first polymer has a glass transition temperature in the range of −30° C. to 100° C. and contains as polymerized units, based on the weight of the first polymer, from: 85 to 99.9 weight % comonomer, 0 to 5 weight % anionic monomer, and 0.1 to 10 weight % multiethylenically unsaturated monomer, and wherein the second polymer has a glass transition temperature in the range of −10° C. to less than 18° C. and contains as polymerized units, based on the weight of the second polymer, from: 70 to 99 weight % comonomer, 0 to 10 weight % anionic monomer, and 1 to 20 weight % crosslinking monomer.

In the second aspect of this invention, a process is provided for preparing a polymer composition containing polymer particles dispersed in an aqueous medium, including the steps of: forming particles of a first polymer having a glass transition temperature in the range of −30° C. to 100° C. and containing as polymerized units, based on the weight of the first polymer, from 85 to 99.9 weight % comonomer, 0 to 5 weight % anionic monomer, and 0.1 to 10 weight % multiethylenically unsaturated monomer; and forming a second polymer in the presence of the particles of the first polymer, wherein the second polymer has a glass transition temperature in the range of −10° C. to less than 18° C. and contains as polymerized units, based on the weight of the second polymer, from 70 to 99 weight % comonomer, 0 to 10 weight % anionic monomer, and 1 to 20 weight % crosslinking monomer; wherein the polymer particles contain from 10 to 70 weight % the first polymer and from 30 to 90 weight % the second polymer, based on weight of the polymer particles.

In the third aspect of this invention, a method is provided for preparing a coated article including the steps of: applying a polymer composition onto a substrate; wherein the polymer composition contains polymer particles dispersed in an aqueous medium; wherein the polymer particles contains, based on the weight of the polymer particles: from 10 to 70 weight % first polymer, and from 30 to 90 weight % second polymer;

wherein the first polymer has a glass transition temperature in the range of −30° C. to 100° C. and contains as polymerized units, based on the weight of the first polymer, from 85 to 99.9 weight % comonomer, 0 to 5 weight % anionic monomer, and 0.1 to 10 weight % multiethylenically unsaturated monomer, and wherein the second polymer has a glass transition temperature in the range of −10° C. to less than 18° C. and contains as polymerized units, based on the weight of the second polymer, from 70 to 99 weight % comonomer, 0 to 10 weight % anionic monomer, and 1 to 20 weight % crosslinking monomer; and drying or allowing to dry the polymer composition.

The fourth aspect of this invention provides a coated article including a substrate and a coating prepared from a polymer composition containing polymer particles dispersed in an aqueous medium; wherein the polymer particles contains, based on the weight of the polymer particles from 10 to 70 weight % first polymer and from 30 to 90 weight % second polymer; wherein the first polymer has a glass transition temperature in the range of −30° C. to 100° C. and contains as polymerized units, based on the weight of the first polymer, from 85 to 99.9 weight % comonomer, 0 to 5 weight % anionic monomer, and 0.1 to 10 weight % multiethylenically unsaturated monomer, and wherein the second polymer has a glass transition temperature in the range of −10° C. to less than 18° C. and contains as polymerized units, based on the weight of the second polymer, from 70 to 99 weight % comonomer, 0 to 10 weight % anionic monomer, and 1 to 20 weight % crosslinking monomer.

As used herein, the term "(meth)acrylate" refers to either acrylate or methacrylate and the term "(meth)acrylic" refers to either acrylic or methacrylic.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers may be found, for example, in "Polymer Handbook", edited by J. Brandrup and E. H. Immergut, Interscience Publishers. The values of $T_g$ reported herein for the first polymer and the second polymer are calculated based on the Fox equation.

The polymer composition of this invention includes polymer particles having a select composition including a first polymer and a second polymer. The first polymer has a composition that includes at least one multiethylenically unsaturated monomer as a polymerized unit. The second polymer contains crosslinking groups capable of forming crosslinks after formation of a film containing the polymer particles. The polymer composition is useful for forming hard films with minimal levels of coalescent or without coalescent.

The first polymer and second polymer components of the polymer particles are formed by the polymerization of ethylenically unsaturated monomers. The first polymer contains as polymerized units, comonomer, multiethylenically unsaturated monomer, and optionally, anionic monomer. The types and levels of comonomer, anionic monomer, and multiethylenically unsaturated monomer are chosen to provide a first polymer having a Tg in the range of –30° C. to 100° C., preferably in the range of –20° C. to 50° C., and more preferably in the range of –15° C. to 30° C. The second polymer contains as polymerized units, comonomer, crosslinking monomer, and optionally, anionic monomer. The levels of comonomer, optional anionic monomer, and crosslinking monomer are chosen to provide a second polymer having a $T_g$ in the range of –10° C. to less than 18° C., preferably in the range of –5° C. to 15° C., and more preferably in the range of 0° C. to 10° C.

The calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form. Values of glass transition temperatures for the homopolymers that are not reported in the literature, are measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to –100° C., and then heated to 150° C., at a rate of 20° C./minute while data is collected. The glass transition temperature for the homopolymer is measured at the midpoint of the inflection using the half-height method.

Multiethylenically unsaturated monomers are monomers containing at least two ethylenically unsaturated groups and do not contain crosslinking group selected from acetoacetoxy groups and cyanoacetoxy groups. Suitable multiethylenically unsaturated monomers include ethylene glycol diacrylate, ethylene glycol dimethacrylate, triethylene glycol dimethacrylate, tetraethylene glycol dimethacrylate, 1,3-butylene, glycol dimethacrylate, trimethylolpropane triacrylate, trimethylol propane trimethacrylate, 1,4-butanediol diacrylate, 1,4-butanediol dimethacrylate, neopentyl glycol diacrylate, neopentyl glycol dimethacrylate, 1,6-hexanediol diacrylate, 1,6-hexanediol dimethacrylate, pentaerythritol diacrylate, pentaerythritol dimethacrylate, glycerin diacrylate, glycerin dimethacrylate, allyl acrylate, allyl methacrylate, diallyl phthalate, divinyl benzene, or mixtures thereof.

Anionic monomers are ethylenically unsaturated monomers containing acid groups or salts thereof. Suitable acid groups include carboxylic acid groups, phosphorus acid groups, and sulfur acid groups. Anionic monomers include carboxylic acid monomers such as (meth)acrylic acid, fumaric acid, itaconic acid, maleic acid, maleic anhydride, and monoesters of fumaric acid; phosphorus acid monomers such as phosphoethyl (meth)acrylate and allyl phosphonic acid; and sulfur acid monomers such as 2-acrylamido-2-methyl-1-propanesulfonic acid, sulfoethyl (meth)acrylate, and vinyl sulfonic acid. The first polymer or the second polymer may be formed from one or more anionic monomers.

Crosslinking monomers contain at least one ethylenic unsaturation and at least one crosslinking group selected from acetoacetoxy groups and cyanoacetoxy groups. Crosslinking monomers containing acetoacetoxy groups include acetoacetoxy functional monomers having the structure:

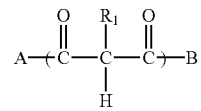

and crosslinking monomers containing cyanoacetoxy groups include cyanoacetoxy functional monomers having the structure:

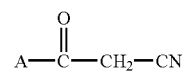

wherein
$R_1$ is either H, alkyl having 1 to 10 carbon atoms, or phenyl;
A is either:

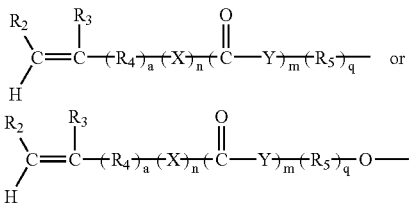

wherein
$R_2$ is either H, alkyl having 1 to 10 carbon atoms or phenyl, substituted phenyl, halo, $CO_2CH_3$, or CN;
$R_3$ is either H, alkyl having 1 to 10 carbon atoms or phenyl, substituted phenyl, or halo;

$R_4$ is either alkylene or substituted alkylene having 1 to 10 carbon atoms or phenylene, or substituted phenylene;

$R_5$ is either alkylene or substituted alkylene having 1 to 10 carbon atoms;

a, m, n, and q are independently either 0 or 1,

X and Y are independently either —NH— or —O—;

B is either A, alkyl having 1 to 10 carbon atoms or phenyl, substituted phenyl, or heterocyclic.

Suitable acetoacetoxy functional monomers include acetoacetoxyethyl (meth)acrylate, acetoacetoxypropyl (meth)acrylate, allyl acetoacetate, acetacetoxybutyl (meth)acrylate, 2,3-di(acetoacetoxy)propyl (meth)acrylate, and vinyl acetoacetate. Suitable cyanoacetoxy functional monomers include cyanoacetoxyethyl (meth)acrylate, cyanoacetoxypropyl (meth)acrylate, allyl cyanoacetate, and vinyl cyanoacetate. The second polymer may be polymerized from a mixture containing one or more crosslinking monomers.

The first polymer and the second polymer also contain comonomers as polymerized units. Comonomers are ethylenically unsaturated monomers that are not anionic monomers, multiethylenically unsaturated monomers, or crosslinking monomers. Suitable comonomers include, for example, (meth)acrylic esters including $C_1$ to $C_{40}$ esters of (meth)acrylic acid such as methyl (meth)acrylate, ethyl (meth)acrylate, butyl (meth)acrylate, 2-ethylhexyl (meth)acrylate, decyl (meth)acrylate, lauryl (meth)acrylate, stearyl (meth) acrylate, isobornyl (meth)acrylate; hydroxyalkyl esters of (meth)acrylic acid such as hydroxyethyl (meth) acrylate and hydroxypropyl (meth)acrylate; styrene or substituted styrenes; vinyl acetate or other vinyl esters; vinyl monomers such as vinyl chloride, vinylidene chloride, N-vinyl pyrrolidone; acrylonitrile, methacrylonitrile, acrylamide, and methacrylamide.

The first polymer contains as polymerized units, from 85 to 99.9 weight % comonomer, preferably from 88 to 99.5 weight % comonomer, and more preferably from 95 to 99.5 weight % comonomer, based on the weight of the first polymer. The first polymer also contains as polymerized units, from 0.1 to 10 weight % multiethylenically unsaturated monomer, preferably from 0.15 to 8 weight % multiethylenically unsaturated monomer, and more preferably from 0.2 to 5 weight % multiethylenically unsaturated monomer, based on the weight of the first polymer. The first polymer contains as polymerized units, from 0 to 5 weight % anionic monomer, preferably from 0.1 to 5 weight % anionic monomer, and more preferably, from 0.2 to 1 weight % anionic monomer, based on the weight of the first polymer.

The second polymer contains as polymerized units, from 70 to 99 weight % comonomer, preferably from 80 to 98 weight % comonomer, and more preferably from 85 to 96 weight % comonomer, based on the weight of the second polymer. The second polymer also contains as polymerized units, from 0 to 10 weight % anionic monomer, preferably from 0.5 to 7 weight % anionic monomer, and more preferably from 1 to 5 weight % anionic monomer, based on the weight of the second polymer. Further, the second polymer contains as polymerized units, from 1 to 20 weight % crosslinking monomer, preferably from 3 to 15 weight % crosslinking monomer, and more preferably from 5 to 10 weight % crosslinking monomer, based on the weight of the second polymer.

Specific combinations of the monomer components are chosen to undergo copolymerization to prepare the composition of the first polymer or the composition of the second polymer, and to provide polymer particles and coatings prepared from the polymer particles with desired application properties, as is known in the art.

The polymer particles may have morphologies in which the second polymer fully or partially encapsulates the first polymer. Suitable morphologies include core-shell polymers in which the first polymer forms the core and the second polymer forms the shell, a polymer particle in which the first polymer forms two or more domains within the second polymer shell, and an acorn morphology in which the second polymer partially covers the first polymer core and provides the majority of the surface area of the polymer particle. A preferred morphology is a core-shell polymer with a first polymer core and a second polymer shell. Electron microscopy in combination with heavy metal staining techniques may be used to determine polymer particle morphology.

The polymer particles may have average particle diameters in the range of 40 nm to 1000 nm, preferably in the range of 60 nm to 500 nm, and more preferably in the range of 80 nm to 200 nm. The average particle diameter may be measured by a quasi-elastic light scattering technique, using an instrument such as a Brookhaven Model BI-90 Particle Sizer, supplied by Brookhaven Instruments Corporation, Holtsville, N.Y.

The polymer composition contains the polymer particles dispersed in an aqueous medium. The aqueous medium may contain cosolvents including water miscible cosolvents such as methanol, ethanol, propanol, acetone ethylene glycol ethyl ethers, propylene glycol propyl ethers and diacetone alcohol; and water immiscible solvents such as propyl acetate, butyl acetate, methyl isoamyl ketone, amyl acetate, diisobutyl ketone, xylene, toluene, butanol, and mineral spirits. Preferably the polymer composition contains from 0 to 20 weight % cosolvent, more preferably, from 0 to 10 weight % cosolvent, and more preferably, from 0 to 8 weight % cosolvent, based on the weight of the polymer composition. The polymer composition may be provided with 10 to 70 weight % polymer particles, based on the weight of the polymer composition.

The polymer composition containing the polymer particles may be prepared by suspension or emulsion polymerization techniques. The polymerization may be a two-stage or a multi-stage process. In a two-staged process, the first polymer may be prepared by aqueous emulsion polymerization of a first monomer mixture containing at least one comonomer, at least one multiethylenically unsaturated monomer, and optionally, at least one anionic monomer to form particles of the first polymer. Next, the second polymer is prepared by aqueous emulsion polymerization of a second monomer mixture containing at least one comonomer, at least one anionic monomer, and at least one crosslinking monomer in the presence of the first polymer particles.

The practice of emulsion polymerization is discussed in detail in D. C. Blackley, *Emulsion Polymerization* (Wiley, 1975). Conventional emulsion polymerization techniques may be used to prepare the polymer composition of this invention as an aqueous dispersion of polymer particles. The practice of emulsion polymerization is also discussed in H. Warson, *The Applications of Synthetic Resin Emulsions,* Chapter 2 (Ernest Benn Ltd., London 1972).

Thus the ethylenically unsaturated monomers including the comonomer, the ionic monomer, multiethylenically unsaturated monomer and the crosslinking monomer may be emulsified with an anionic or nonionic dispersing agent, also referred to as a surfactant, using for example from 0.05 to 10% by weight of dispersing agent on the weight of total monomers. Combinations of anionic and nonionic dispersing agents may also be used. High molecular weight polymers such as hydroxy ethyl cellulose, methyl cellulose, and vinyl alcohol may be used as emulsion stabilizers and protective colloids, as may polyelectrolytes such as polyacrylic acid. Acidic monomers particularly those of low molecular weight, such as acrylic acid and methacrylic acid, are water soluble, and thus may serve as dispersing agents which aid in emulsifying the other monomers used.

Suitable anionic dispersing agents include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoyllaurate, sodium oleyl isothionate; alkali metal salts and ammonium salts of alkylarylpolyethoxyethanol sulfates, sulfonates, or phosphates, such as sodium tert-octylphenoxypolyethoxyethyl sulfate having 1 to 50 oxyethylene units; alkali metal salts and ammonium salts of alkyl polyethoxyethanol sulfates, sulfonates, and phosphates; and alkali metal salts and ammonium salts of aryl polyethoxyethanol sulfates, sulfonates, and phosphates.

Suitable nonionic dispersing agents include alkylphenoxypolyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthiophenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene oxide condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections. Mixtures of alkyl benzenesulfonates and ethoxylated alkylphenols may be employed.

The first polymer or the second polymer may contain as a polymerized unit a copolymerizable surfactant having at least one polymerizable ethylenically unsaturated bond.

Preferably the polymer composition containing the polymer particles contains a total level of surfactant of 10 weight % or less, more preferably 7.5 weight % or less, and most preferably 5 weight % or less, based on the weight of the polymer particles. Although higher levels of surfactant may be used, in many coating applications, the surfactant may adversely affect coating properties such as moisture resistance.

A polymerization initiator of the free radical type, such as ammonium or potassium persulfate, may be used alone or as the oxidizing component of a redox system, which also includes a reducing component such as potassium metabisulfite, sodium thiosulfate, or sodium formaldehyde sulfoxylate. The reducing component is frequently referred to as an accelerator. The initiator and accelerator, commonly referred to as catalyst, catalyst system, or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II) and ammonium persulfate/sodium bisulfite/sodium hydrosulfite/Fe(II). Other suitable initiators include azo compounds. The polymerization temperature may be from 10° C. to 90° C., or more, and may be optimized for the catalyst system employed, as is conventional. Emulsion polymerization may be seeded or unseeded.

Chain transfer agents such as mercaptans, polymercaptan, and polyhalogen compounds in the polymerization mixture may be used to moderate the molecular weight of the first polymer or the second polymer. Examples of chain transfer agents which may be used include long chain alkyl mercaptans such as t-dodecyl mercaptans, alcohols such as isopropanol, isobutanol, lauryl alcohol, or t-octyl alcohol, carbon tetrachloride, tetrachloroethylene, and trichlorobromoethane. Generally from 0.1 to 3 weight %, based on the weight of total monomer in the first polymer or the second polymer, may be used. Alternatively, suitable molecular weights may be obtained by increasing the initiator level, or by a combination of increased initiator level and a chain transfer agent.

The polymerization process to prepare the first polymer or the second polymer may be a thermal or redox type; that is, free radicals may be generated solely by the thermal dissociation of an initiator species or a redox system may be used. A monomer emulsion containing all or some portion of the monomers to be polymerized may be prepared using the monomers, water, and surfactants. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of the polymerization catalyst. The temperature of the reaction vessel during the emulsion polymerization may be controlled by cooling to remove heat generated by the polymerization reaction or by heating the reaction vessel. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. The pH of the contents of the reaction vessel may also be altered during the course of the emulsion polymerization process. Preferably the pH of the emulsion polymerization process to prepare the first polymer or the second polymer is less than 8, more preferably in the range of 2–6.

Other components may be added to the polymer composition of this invention, including without limitation, other polymers such as vinyl acetate polymers, styrene butadiene polymers, acrylic copolymers, and vinyl chloride copolymers; surfactants; plasticizers; buffers; neutralizers; humectants; waxes; dyes; pearlescents; adhesion promoters; tackifiers; dispersants; defoamers; leveling agents; optical brighteners; ultraviolet stabilizers such as hindered amine light stabilizers; coalescents; rheology modifiers or thickeners; preservatives; biocides; and antioxidants.

Additionally, the polymer composition may contain crosslinking agents that are reactive with the acetoacetoxy groups or the cyanoacetoxy groups of the polymer particles. The type of crosslinking agent and the level of crosslinking agent are chosen such that the ability of the polymer composition to form a film is not materially affected. Suitable crosslinking agents include, for example, multifunctional amine compounds, oligomers, and polymers that have at least two amine groups such as hexamethylene diamine, ethylenediamine, 1,2-diaminopropane, 2-methyl-1,5-pentane diamine, 1,4-diaminobutane, 1,12-diaminododecane, 1,2-diaminocylcohexane, 1,2-phenyldiamine, diaminotoluene, polyethylene imine, difunctional and trifunctional Jeffamines™ curing agents (Huntsman Petrochemical Corporation), and aqueous polyurethane dispersions with pendant amino, hydrazide or hydrazine groups; aminosilane epoxy silanes such as 3-aminopropyltrimethoxysilane, 3-aminopropyltriethoxysilane, 3-aminopropylmethyldimethoxysilane, 3-aminopropylmethyldiethoxysilane, 3-aminopropyltriisopropoxysilane,
3-aminopropylmethyldiisopropoxysilane, 3-aminopropylmethyldiisopropoxysilane, 3-aminopropyltriisopropoxysilane, N-2-aminoethyl-3-aminopropyltrimethoxysilane, N-2-aminoethyl-3-aminopropyltriethoxysilane, N-2-aminoethyl-3-aminopropylmethyldimethoxysilane, N-2-aminoethyl-3-aminopropylmethyldiethoxysilane, N-2-aminoethyl-3-aminopropyltriisopropoxysilane, N-2-aminoethyl-3-aminopropyltriisopropoxysilane, N-2-aminoethyl-3-aminopropylmethyldiisopropoxysilane, and N-2-aminoethyl-3-aminopropylmethyldiisopropoxysilane;
epoxy silanes such as glycidoxypropyltrimethoxysilane, glycidoxypropylmethyldimethoxysilane, glycidoxypropyltriethoxysilane, glycidoxypropylmethyldiethoxysilane, or beta-(3,4-epoxycyclohexyl)ethyltriethoxysilane; multifunctional isocyanates such as Bayhydur™ XP-7063 isocyanate (Bayer); aliphatic carbodiimides such as Ucarlink™ XL-29SE crosslinker, or those disclosed in U.S. Pat. No. 4,977,219; aromatic carbodiimides such as disclosed in U.S. Pat. No. 5,574,083; divalent metal ions such as $Zn^{2+}$, $Mg^{2+}$, $Ca^{2+}$; and zirconates such as ammonium zirconium carbonate. Preferably, the multifunctional amine compounds employed as crosslinking agents in the polymer composition are primary amine groups. Preferred levels for the multifunctional amine compounds with primary amine groups in the polymer composition is a ratio of 0.1 to 1 primary amine groups per acetoacetoxy group, cyanoacetoxy groups, or combination thereof. Preferred aminosilanes include N-2-aminoethyl-3-aminopropylmethyldimethoxysilane, N-2-aminoethyl-3-aminopropyltrimethoxysilane, and 3-aminopropylmethyldimethoxysilane.

The polymer composition may contain pigment at pigment volume concentrations in the range of 0 to 85%, preferably in the range of 0 to 45%, and more preferably in the range of 0 to 25%. The pigment volume concentration of a species of pigment particles is the percentage of the volume occupied by that species of pigment particles, based on the total volume of the dried coating prepared from the coating composition. Suitable pigments include inorganic pigments, organic pigments, and fillers such as titanium dioxide, iron oxide, zinc oxide, magnesium silicate, calcium carbonate, organic and inorganic colored pigments, aluminosilicates, silica, and various clays. Suitable organic pigments also include plastic pigments such as solid bead pigments and microsphere pigments containing voids or vesicles, and inorganic pigments. Examples of solid bead pigments include polystyrene and polyvinyl chloride beads. Examples of microsphere pigments, which include polymer particles containing one or more voids and vesiculated polymer particles, are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422. Other suitable pigments include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England ); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

A volatile organic compound (VOC) may be added to the polymer composition to improve the film properties or to aid in the application properties of the polymer composition. Examples of such compounds include solvents and coalescents such as glycol ethers, organic esters, aromatic compounds, ethylene and propylene glycol, and aliphatic hydrocarbons. A volatile organic compound (VOC) is defined herein as a carbon containing compound that has a boiling point below 280° C. at atmospheric pressure, compounds such as water and ammonia being excluded from VOCs. In one embodiment, the polymer composition of this invention is a low VOC polymer composition. As used herein, low VOC polymer composition refers to a polymer composition containing from 0.01 to less than 6% VOC by weight, preferably from 0.01 to less than to 3% VOC, and more preferably from 0.01 to less than 2% VOC, based on the total weight of the polymer composition.

The polymer composition of this invention may be applied onto substrates using conventional coating application methods, such as, for example, brushing, rolling, dipping, and spraying methods. Substrates to which the polymer composition of this invention may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, Zincalum™ metal, Zincalum™ II metal, aluminum, wrought iron, drop forged steel, and stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; leather; and woven and nonwoven material such as cloth, wool, synthetic and natural fiber, and textiles. The polymer composition may be used, for example, as a wood coating, maintenance coating, interior or exterior wall coating, metal primer or coating, traffic paint, woven or nonwoven textile saturant or coating, leather coating, coil coating, architectural coating, mastic sealant, caulk, board coating, paper coating, ink, overcoat varnish, flooring coating, and adhesive. Coatings prepared from the polymer composition may be clear coatings, flat coatings, satin coatings, semi-gloss coatings, gloss coatings, primers, textured coatings, and the like.

After the polymer composition has been applied to a substrate, the polymer composition is dried or is allowed to dry to form a film. Heat may be applied to dry the polymer composition. After the film formation step, the film which contains the polymer particles is cured or allowed to cure to form a crosslinked film. The reaction of the select crosslinking groups contained in the polymer particles are believed to result in the formation of crosslinks. The curing step may begin during the drying of the polymer composition provided that the extent of crosslinking does not interfere with film formation. Curing to obtain useful properties may take place at ambient temperatures such as, for example, from 0° C. to 35° C. However, it is sometime desirable to accelerate the rate of property development by heating the applied polymer composition to a temperature from 25° C. to 200° C.

| Abbreviations: | |
|---|---|
| AAEM | acetoacetoxyethyl methacrylate |
| ALMA | allyl methacrylate |
| BA | butyl acrylate |
| MAA | methacrylic acid |
| MMA | methyl methacrylate |
| Surfactant A | nonyl phenoxy polyethoxy sulfate salt (58 wt. % active) |

EXAMPLE 1

The reaction vessel was a 5-liter, four necked round bottom flask equipped with a paddle stirrer, a thermometer, nitrogen inlet, and a reflux condenser. A first monomer mixture was prepared by mixing 145 g deionized water, 6.6 g Surfactant A, 361.1 g BA, 433.3 g MMA, 4.0 g MAA, and 4.0 g ALMA. A second monomer mixture was prepared by combining 476 g deionized water, 15.6 g Surfactant A, 541.6 g BA, 535.6 g MMA, 90.3 g AAEM, and 36.1 g MAA. Both monomer mixtures were emulsified. To the reaction vessel was added 1400 g deionized water and 10.4 g Surfactant A and heated to 83° C. Next, 110 g of the first monomer mixture were added to the reaction vessel followed by a mixture of 4 g ammonium persulfate dissolved in 22 g deionized water. The remainder of the first monomer mixture and a separate initiator feed of a mixture of 0.72 g ammonium persulfate dissolved in 47.2 g deionized water were added to the reaction vessel over a period of 40 minutes, while maintaining the contents of the reaction vessel at 83–85° C. After the complete addition of the first monomer mixture, the contents of the reaction vessel were maintained at 83–85° C. for 15 minutes. Next, the second monomer mixture and an initiator mixture containing 1.08 g ammonium persulfate dissolved in 70.8 g deionized water were added separately to the reaction vessel over 65 minutes while maintaining the contents of the reaction vessel at 83–85° C. After the complete addition of the second monomer mixture, the contents of the reaction vessel were allowed to cool to 75° C. A mixture of 46.9 g ammonium hydroxide (29%) dissolved in 49.0 g deionized water was added. The resulting polymer composition, Example 1, was diluted with deionized water to 43.0 weight % solids. Example 1 had an average particle diameter of 104 nm, a viscosity of 90 cps, and a pH of 9.1.

COMPARATIVE A

Comparative A was prepared according to the procedure for Example 1 except that the second monomer mixture contained 476 g deionized water, 15.6 g Surfactant A, 421.3 g BA, 656.0 g MMA, 90.3 g AAEM, and 36.1 g MAA. The resulting comparative polymer composition, Comparative A, was diluted with deionized water to 42.9 weight % solids. Comparative A had an average particle diameter of 115 nm, a viscosity of 134 cps, and a pH of 9.1.

COMPARATIVE B

The reaction vessel was a 5-liter, four necked round bottom flask equipped with a paddle stirrer, a thermometer, nitrogen inlet, and a reflux condenser. A monomer mixture was prepared by mixing 621 g deionized water, 22.2 g Surfactant A, 982.9 g BA, 982.9 g MMA, and 40.1 g MAA. The monomer mixture was emulsified. To the reaction vessel was added 1400 g deionized water and 10.4 g Surfactant A and heated to 84° C. Next, 110 g of the monomer mixture were added to the reaction vessel followed by a mixture of 4 g ammonium persulfate dissolved in 22 g deionized water. The remainder of the monomer mixture and a separate initiator feed of a mixture of 1.8 g ammonium persulfate dissolved in 118 g deionized water were added to the reaction vessel over a period of 105 minutes, while maintaining the contents of the reaction vessel at 83–85° C. After the complete addition of the monomer mixture, the contents of the reaction vessel were maintained at 83–85° C. for 15 minutes and then allowed to cool to 75° C. A mixture of 25.0 g ammonium hydroxide (29%) dissolved in 49.0 g deionized water was added. The resulting comparative polymer composition, Comparative B, was diluted with deionized water to 43.5 weight % solids. Comparative B had an average particle diameter of 108 nm, a viscosity of 152 cps, and a pH of 9.4.

COMPARATIVE C

A comparative polymer composition was prepared according to the procedure of Comparative B except that the monomer mixture contained 621 g deionized water, 22.2 g Surfactant A, 782.3 g BA, 1183.5 g MMA, and 40.1 g MAA. The resulting comparative polymer composition, Comparative C, was diluted with deionized water to 43.6 wt. % solids. Comparative C had an average particle diameter of 103 nm, a viscosity of 106 cps, and a pH of 9.2.

The Tgs of the polymer particles of Example 1 and the comparative polymer particles of Comparatives A–C were calculated according to the Fox equation using the values for the Tgs listed in Table 1.1.

TABLE 1.1

Glass Transition Values for Various Homopolymers

| Homopolymer | $T_g$ (K) |
|---|---|
| AAEM | 280.5 |
| ALMA | 378 |
| BA | 219 |
| MAA | 501 |
| MMA | 378 |

In Table 1.2, the Tgs for the polymer particles of Example 1 and the comparative polymer particles of Comparatives A–C are listed.

TABLE 1.2

Tgs of Polymer Particles and Comparative Polymer Particles

| | Example 1 | Comparative A | Comparative B | Comparative C |
|---|---|---|---|---|
| First Polymer (Wt. % of Polymer Particle) | 40 | 40 | 100 | 100 |
| First Polymer $T_g$ | 13° C. | 13° C. | 6° C. | 22° C. |
| Second Polymer (Wt. % of Polymer Particle) | 60 | 60 | | |
| Second Polymer $T_g$ | 7° C. | 24° C. | | |

EXAMPLE 2

Preparation of Coating Composition and Comparative Coating Composition

A titanium dioxide slurry was prepared by combining the ingredients in Table 2.1 and dispersing the titanium dioxide pigment with high shear mixing.

TABLE 2.1

Ingredients for Titanium Dioxide Slurry

| Ingredient | Amount | Source |
|---|---|---|
| Water | 50.0 g | |
| Tamol ™ 731A dispersant | 11.4 g | Rohm and Haas Company |
| Tego ™ Foamex 810 defoamer | 1.0 g | |
| Surfynol ™ CT-111 surfactant | 2.0 g | Air Products and Chemical, Inc. |
| Ti-Pure ™ R-706 titanium dioxide | 228.4 g | E. I. DuPont de Nemours and Co. |

Next, a coating composition, Example 2, was formulated by combining the titanium dioxide slurry with the ingredients listed in Table 2.2.

TABLE 2.2

Additional Coating Composition Ingredients

| Ingredient | Amount | Source |
|---|---|---|
| Polymer composition of Example 1 | 265.7 g (based on solids) | |
| Water | 465.1 g | |
| Texanol ™ coalescent | 16.7 g | Eastman Chemical Co. |
| Surfynol CT-111 surfactant | 1.0 g | Air Products and Chemical, Inc. |
| Acrysol ™ RM-2020 rheology modifier | 16.0 g | Rohm and Haas Company |
| Acrysol ™ RM-8W rheology modifier | 1.0 g | Rohm and Haas Company |

Comparative coating compositions were also prepared according to the above procedure by replacing the polymer composition of Example 1 with an equivalent quantity (based on solids) of a comparative polymer composition. The comparative coating compositions of Comparative D, Comparative E, and Comparative F were formulated with the comparative polymer compositions of Comparative A, Comparative B, and Comparative C, respectively.

EXAMPLE 3

Preparation and Evaluation of Coated Substrates

Low Temperature Film Formation (LTFF)

The materials and coating composition are equilibrated prior to testing for at least one hour at the test conditions of 4.4° (40° F.) and 70% relative humidity. The coating composition is applied by brush onto a white pine board. The coating composition is applied perpendicular to the wood grain to form a stripe having dimensions of 5 cm by 12.7 cm. The spread rate of the coating composition is 11 m²/liter (450 ft²/gal) and is determined by weight. The applied coating composition is allowed to dry at the test conditions for at least 24 hours. Next, the low temperature film formation is evaluated by examining the dried coating composition for cracking. The degree of cracking was characterized using a 10× magnifying glass according to with the following rating scale. Ratings of 6 and greater are considered acceptable low temperature film formation.

10=none
9=trace
8=trace/slight
7=slight
6=slight/moderate
5=moderate
4=moderate/heavy
3=heavy
2=heavy/very heavy
1=very heavy Film Hardness: The coating composition is applied to an aluminum panel with a 0.127 mm (5-mil) gap drawdown applicator and allowed to dry at 60° C. (140° F.) for 7 days. The hardness is measured using a Konig (Pendulum) Hardness tester according to ASTM D4366. The results are expressed in seconds. A hardness value of 65 seconds and greater is considered an acceptable level of hardness.

TABLE 3.1

Low Temperature Film Formation and Hardness of Coated Substrates and Comparative Coated Substrates

| Coating Composition | Low Temperature Film Formation | Hardness |
|---|---|---|
| Example 2 | 8 | 73 |
| Comparative D | 2 | 104 |
| Comparative E | 10 | 56 |
| Comparative F | 2 | 116 |

The results show that the coating composition of Example 2, which was prepared from the polymer composition of this invention, provided a coating with a combination of acceptable low temperature film formation and an acceptable level of hardness. In contrast, a coating prepared from Comparative D, a comparative coating composition containing comparative polymer particles having a second polymer with a $T_g$ of 24° C., did not have an acceptable level of low temperature film formation. The comparative coating compositions containing comparative polymer particles having only one polymer had either unacceptable hardness (Comparative E) or unacceptable low temperature film formation (Comparative F).

We claim:

1. A polymer composition comprising polymer particles dispersed in an aqueous medium, wherein said polymer particles comprise, based on the weight of said polymer particles:
   a) from 10 to 70 weight % first polymer; and
   b) from 30 to 90 weight % second polymer;
wherein said first polymer has a Tg in the range of 15° C. to less than 30° C. and comprises as polymerized units, based on the weight of said first polymer, from:
   i) 85 to 99.9 weight % comonomer,
   ii) 0 to 5 weight % anionic monomer, and
   iii) 0.1 to 10 weight % multiethylenically unsaturated monomer,
wherein said second polymer has a Tg in the range of −5° C. to 15° C. and comprises as polymerized units, based on the weight of said second polymer, from:
   i) 70 to 99 weight % comonomer,
   ii) 0 to 10 weight % anionic monomer, and
   iii) 1 to 20 weight % crosslinking monomer;
and wherein the polymer composition comprises from 0.01 to less than 2 weight % volatile organic compounds, based on the weight of said polymer composition, and the polymer composition has degree of cracking of at least 6 and a hardness value of at least 65 seconds.

2. The polymer composition according to claim 1 wherein said crosslinking monomer is selected from the group consisting of acetoacetoxyethyl (meth)acrylate, acetoacetoxypropyl (meth)acrylate, acetacetoxybutyl (meth)acrylate, 2,3-di(acetoacetoxy)propyl (meth)acrylate, allyl acetoacetate, and vinyl acetoacetate.

3. The polymer composition according to claim 1 wherein said polymer composition has a pigment volume concentration in the range of 0 to 25.

4. The polymer composition according to claim 1 further comprising 0 to 20 weight % cosolvent based on the weight of said polymer composition.

* * * * *